US012727693B2

(12) United States Patent
Lai

(10) Patent No.: US 12,727,693 B2
(45) Date of Patent: Sep. 8, 2026

(54) PORTABLE CHOPSTICK AND CHOPSTICK BODY ALIGNING STRUCTURE THEREOF

(71) Applicant: Layana Co., Ltd., Changhua County (TW)

(72) Inventor: Yin-Chu Lai, Changhua County (TW)

(73) Assignee: Layana Co., Ltd., Changhua County (TW)

( * ) Notice: Subject to any disclaimer, the term of this patent is extended or adjusted under 35 U.S.C. 154(b) by 980 days.

(21) Appl. No.: 17/960,198

(22) Filed: Oct. 5, 2022

(65) Prior Publication Data

US 2023/0104423 A1 Apr. 6, 2023

(30) Foreign Application Priority Data

Oct. 5, 2021 (JP) ................................ 2021-163971

(51) Int. Cl.
*A47G 21/06* (2006.01)
*F16B 7/18* (2006.01)

(52) U.S. Cl.
CPC ............. *A47G 21/103* (2013.01); *F16B 7/18* (2013.01)

(58) Field of Classification Search
CPC .................................................... A47G 21/103
See application file for complete search history.

(56) References Cited

U.S. PATENT DOCUMENTS 7,341,293 B2 * 3/2008 Tsai .................... A47G 21/103 294/5.5
7,571,943 B1 * 8/2009 Lee ..................... A47G 21/103 294/5.5
7,896,413 B2 * 3/2011 Shen Ku ............. A47G 21/103 294/5.5
10,104,996 B2 * 10/2018 Chen ................... A47G 21/103
2009/0121501 A1 * 5/2009 Liu ........................ A47G 21/10 294/99.2

FOREIGN PATENT DOCUMENTS

JP 5216374 B2 6/2013
KR 20180057407 A * 5/2018 .......... A47G 21/103
TW M294273 U 7/2006
TW M347886 U * 1/2009

OTHER PUBLICATIONS

Taiwan Office Action corresponding to Application No. 110137039 and issued on Jun. 24, 2022, 8 pages.

* cited by examiner

*Primary Examiner* — Thomas E Lazo
(74) *Attorney, Agent, or Firm* — Innovation Counsel LLP

(57) ABSTRACT

A portable chopstick including two-piece square chopsticks is provided. The two-piece square chopsticks include an upper chopstick body, a lower chopstick body and a chopstick body aligning structure. The upper chopstick body has a lower end joint block; the lower chopstick body has an opposite upper end joint groove. The chopstick body aligning structure can be separated into two parts, which are precisely positioned in the upper chopstick body and the lower chopstick bod respectively, wherein the upper chopstick body and the lower chopstick body can be made of different materials. When the lower end joint block of the upper chopstick body is locked with the upper end joint groove of the lower chopstick body, the upper chopstick body is aligned with the lower chopstick body through the chopstick body aligning structure at their four sides.

17 Claims, 2 Drawing Sheets

PORTABLE CHOPSTICK AND CHOPSTICK BODY ALIGNING STRUCTURE THEREOF

This application claims the benefit of Japan application Serial No. 2021-163971, filed Oct. 5, 2021, the subject matter of which are incorporated herein by reference.

BACKGROUND OF THE INVENTION

Field of the Invention

The invention relates in general to a portable chopstick, and more particularly to a portable chopstick including two-piece square chopsticks and a chopstick body aligning structure thereof.

Description of the Related Art

Bamboo disposable chopsticks are disposed immediately after use, not only causing environmental issues but also destroying the ecological environment. Besides, residuals of hazardous substances, such as preservatives, on the disposable chopsticks may enter human body and cause negative influence. On the other hand, plastic chopsticks are integrally formed in one piece and have a predetermined and irreducible length, causing inconvenience in terms of portability and storage.

To provide better portability, conventional eco-friendly chopsticks are designed as two pieces, and the user has to lock the two pieces together on use. However, the two pieces may easily turn loose due to the misalignment of the jointing parts or repeated use and cause inconvenience of use.

SUMMARY OF THE INVENTION

The invention is directed to a portable chopstick. Through a chopstick body aligning structure, the two-piece chopstick bodies can be quickly locked, fixed and aligned.

According to one embodiment of the present invention, a portable chopstick including two-piece square chopsticks is provided. The two-piece square chopsticks include an upper chopstick body, a lower chopstick body and a chopstick body aligning structure. The upper chopstick body has a lower end joint block; the lower chopstick body has an opposite upper end joint groove. The chopstick body aligning structure can be separated into two parts, which are precisely positioned in the upper chopstick body and the lower chopstick bod respectively, wherein the upper chopstick body and the lower chopstick body can be made of different materials. When the lower end joint block of the upper chopstick body is locked with the upper end joint groove of the lower chopstick body, the upper chopstick body is aligned with the lower chopstick body through the chopstick body aligning structure at their four sides.

According to another embodiment of the present invention, a portable chopstick including two-piece polygonal chopsticks is provided. The two-piece polygonal chopsticks have multiple sides and include an upper chopstick body, a lower chopstick body and a chopstick body aligning structure. The upper chopstick body has a lower end joint block; the lower chopstick body has an opposite upper end joint groove. The chopstick body aligning structure can be separated into two parts, which are precisely positioned in the upper chopstick body and the lower chopstick body respectively, wherein the upper chopstick body and the lower chopstick body can be made of different materials. When the lower end joint block of the upper chopstick body is locked with the upper end joint groove of the lower chopstick body, the upper chopstick body is aligned with the lower chopstick body through the chopstick body aligning structure at their multiple sides.

According to an alternate embodiment of the present invention, a chopstick body aligning structure is provided. The chopstick body aligning structure is used in a portable chopstick and includes a first part and a second part. The first part is suitable to be fitted with one piece of chopstick body of the portable chopstick to form an engagement block; the second part suitable to be fitted with another piece of chopstick body of the portable chopstick to form an engagement groove, wherein each of the first part and the second part has an aligning mark; when the two pieces of chopstick body are tightly locked through the engagement groove and the engagement block, the two aligning marks are located on a straight line.

The above and other aspects of the invention will become better understood with regard to the following detailed description of the preferred but non-limiting embodiment(s). The following description is made with reference to the accompanying drawings.

DETAILED DESCRIPTION OF THE INVENTION

Descriptions of a number of exemplary embodiments are disclosed below with accompanying drawings. It should be understood that the present invention can have different variations and is not limited to the embodiments exemplified in the specification. To the contrary, these embodiments make the present invention more thoroughly and completely understood, so that the concepts of the exemplary embodiments can be conveyed to anyone ordinarily skilled in the technology field of the present invention. In the accompanying drawings, identical element designations are used to indicate identical or similar elements, and repeated descriptions are omitted.

Figure 1:
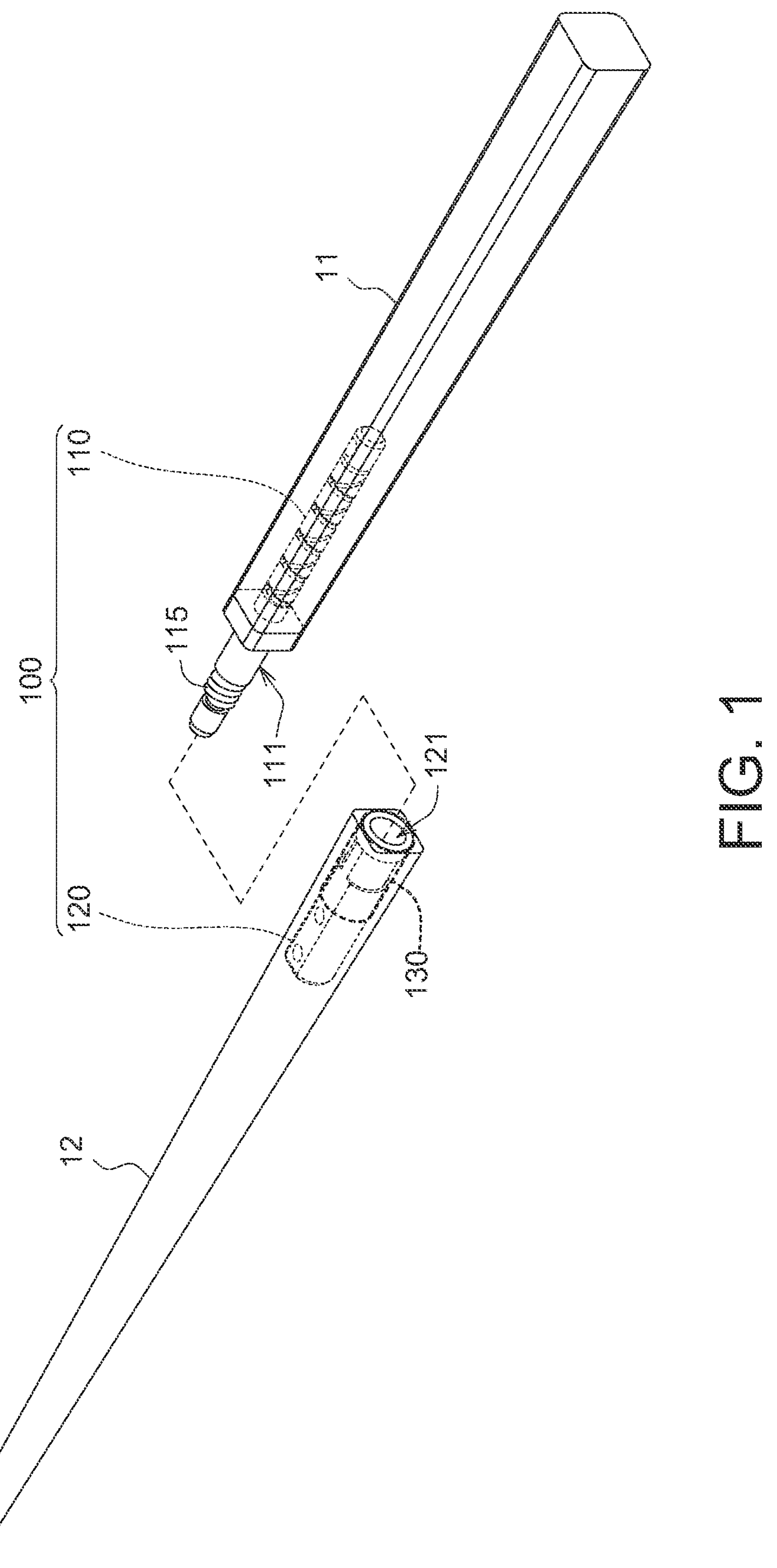
FIG. 1 is an explosion diagram of a portable chopstick according to an embodiment of the present invention.

Referring to FIG. 1, an explosion diagram of a portable chopstick 10 according to an embodiment of the present invention is shown.

In an embodiment, the portable chopstick 10 includes an upper chopstick body 11, a lower chopstick body 12 and a chopstick body aligning structure 100. The upper chopstick body 11 and the lower chopstick body 12 are precisely positioned and fixed through the chopstick body aligning structure 100, so that the upper chopstick body 11 and the lower chopstick body 12 can be quickly locked and aligned.

In an embodiment, the portable chopstick 10 is formed by two-piece square or polygonal chopsticks (such as a hexagon, an octagon or other polygon), and can be separated into two pieces when not in use for the convenience of portability and storage. The upper chopstick body 11 and the lower chopstick body 12 can be square or polygonal metal tubes which are tapered and hollowed. The corner of each chopstick body can be a fillet or a right angle, and the holding portion of the lower chopstick body 12 can have an anti-skid groove for the convenience of food gripping.

Unlike the conventional portable chopsticks which most have a round shape, the portable chopstick 10 of the present embodiment can be two-piece square chopsticks, and the upper chopstick body 11 and the lower chopstick body 12 both have a square or polygonal chopstick body, hence avoiding the problem of round chopsticks rolling on the table. Moreover, when gripping the food with square or polygonal chopsticks, the chopstick bodies and the food come into contact in a line to line (or surface to surface) manner; when gripping the food with round chopsticks, the chopstick bodies and the food come into contact in a point to point manner. Thus, square chopsticks can grip the food more easily and are less likely to drop off the food.

In an embodiment, the upper chopstick body 11 and the lower chopstick body 12 can be made of different or identical materials. For instance, the upper chopstick body 11 can be made of plastics or wood, the lower chopstick body 12 can be made of metal such as stainless steel. Since the upper chopstick body 11 is the part held by the user, a non-metal material, such as plastic, can avoid the feeling of cold touch of metal. However, the non-metal material is not limited to plastics. Furthermore, the lower chopstick body 12 is the part for gripping the food, and can be made of metal such as stainless steel to avoid breeding bacteria. The portable chopstick 10 can be sterilized or disinfected with an ultraviolet light.

In an embodiment, the upper chopstick body 11 can be made of a thermoplastic material or thermosetting plastics. The upper chopstick body 11 is fitted with a first part 110 of the chopstick body aligning structure 100 by way of metal buried injection molding to form a lower end joint block 111, so that the upper chopstick body 11 can have a locking structure (such as a male screw) protruded outwards from its main body. Thus, through the easy molding property of plastics, the upper chopstick body 11 can have a strong binding force with metal and achieve an expected effect.

Besides, the lower chopstick body 12 is a hollowed tube formed by winding a metal piece. For instance, the lower chopstick body 12 can be formed by winding a stainless steel plate into a tapered square or round tube, which is further soldered, grinded and polished to form the desired shape. Alternately, the lower chopstick body 12 is formed by directly pressing a metal tube into the desired shape. The lower chopstick body 12 is fitted with a second part 120 of the chopstick body aligning structure 100 by way of metal buried injection molding to form an upper end joint groove 121, so that a keyhole structure (such as a female screw) can be formed inside the lower chopstick body 12. A plastic injection piece 130 can be inserted into the lower chopstick body 12 and surrounds the second part 120, so that the second part 120 can be firmly positioned and opposite to the first part 110.

Thus, the lower end joint block 111 of the upper chopstick body 11 and the upper end joint groove 121 of the lower chopstick body 12 can be locked with each other and become one piece. That is, the locking structure (such as a male screw) can be inserted into the keyhole structure (such as a female screw) and locked tightly.

It should be noted that conventional round portable chopsticks have an arc surface, the two pieces only need to be locked and do not have to be aligned. However, each of the two-piece square or polygonal chopsticks has four or multiple sides (for example, a hexagonal chopstick has six sides). If the two pieces are not aligned during assembly, there will be misalignment problem after assembly. In the present embodiment, during assembly, the upper chopstick body 11 needs to be aligned with the lower chopstick body 12 through the chopstick body aligning structure 100 at their four or multiple sides.

Figure 2A:
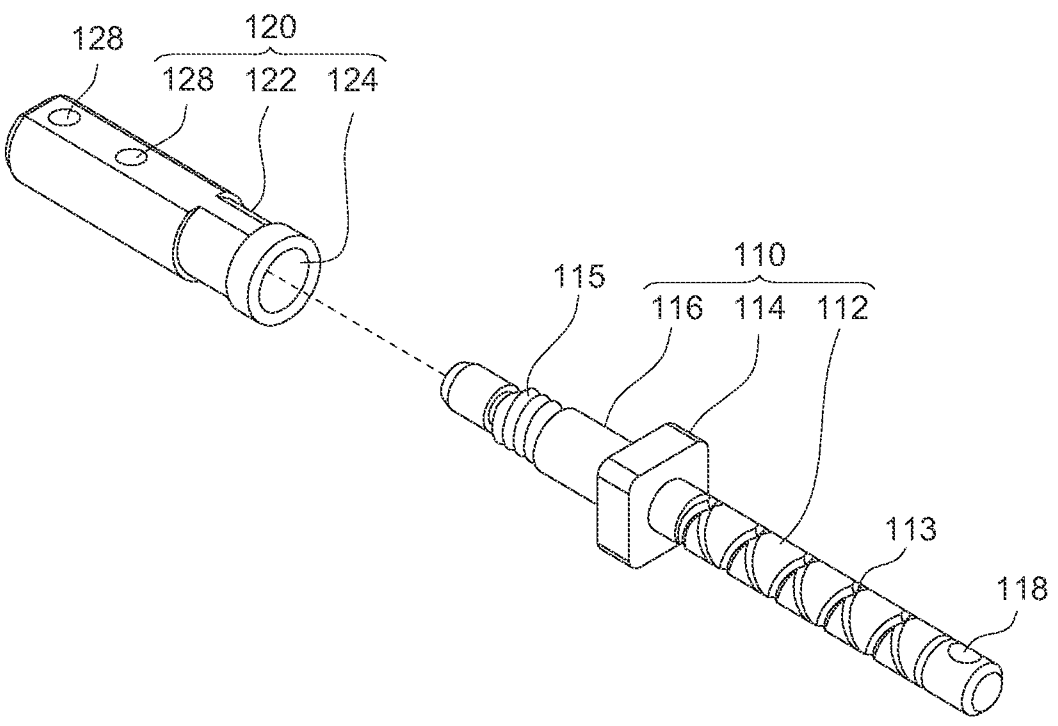
FIG. 2A is an explosion diagram of a chopstick body aligning structure according to an embodiment of the present invention.
Figure 2B:
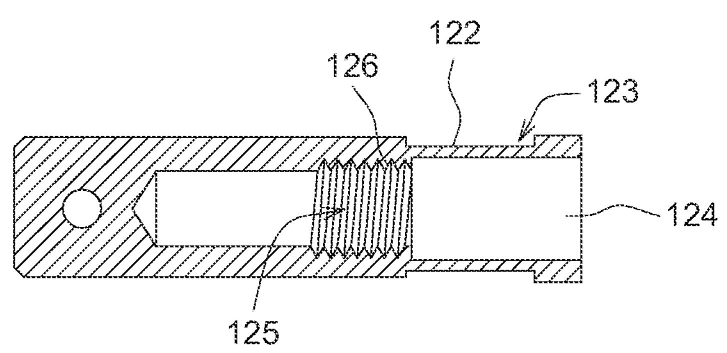
FIG. 2B is a cross-sectional view of a part of a chopstick body aligning structure according to an embodiment of the present invention.

Referring to FIGS. 1, 2A and 2B. FIG. 2A is an explosion diagram of a chopstick body aligning structure 100 according to an embodiment of the present invention. FIG. 2B is a cross-sectional view of a part of a chopstick body aligning structure 100 according to an embodiment of the present invention. The chopstick body aligning structure 100 includes a first part 110 and a second part 120. The first part 110 can be realized by a metal piece formed through the machining of a computer numerical control (CNC) machine; the first part 110 is extended along the long axis of the upper chopstick body 11; one end of the first part 110 has an external thread 115 and the other end has an aligning mark 118 (the number of aligning marks can be one or several; the aligning mark can be recessed pits or cross-lines). Additionally, the second part 120 can be realized by a metal kit formed through the machining of a CNC; the second part 120 is extended along the long axis of the lower chopstick body 12; the inner surface of the second part 120 has an internal thread 125, and the outer surface has another aligning mark 128 (the number of aligning marks can be two; the aligning mark can be recessed pits or cross-lines).

As indicated in FIG. 2A, the first part 110 includes a fitting portion 112, a protrusion 114 and a screw portion 116. The fitting portion 112 can be positioned in the upper chopstick body 11 through the aligning mark 118. The upper chopstick body 11 can encapsulate the fitting portion 112 of the first part 110 by way of metal buried injection molding. After the plastic piece of the upper chopstick body 11 is formed by way of plastic injection, the plastic piece can be engaged with the pattern (such as recessed thread 113) on the fitting portion 112 and becomes fixed.

Furthermore, the protrusion 114 is protruded between the fitting portion 112 and the screw portion 116. The protrusion 114 can be a tetrahedron or a polygon, and the cross-sectional dimension of the protrusion 114 matches the cross-sectional dimension of the upper chopstick body 11. The protrusion 114 can have a metal appearance to enhance the visual effect of square chopsticks. in the present embodiment, the screw portion 116 can be extended from the protrusion 114 to the outside of the upper chopstick body 11, and has an external thread 115 used as a locking structure of the upper chopstick body 11.

Besides, the second part 120 includes a fitting portion 122, an opening 124 and a screw portion 126. The fitting portion 122 can be positioned in the lower chopstick body 12 through the aligning mark 128. The plastic injection piece 130 of the lower chopstick body 12 encapsulates the fitting portion 122 of the second part 120 (referring to FIG. 1, the plastic injection piece 130 is located between the lower chopstick body 12 and the second part 120). The plastic injection piece 130 is formed by way of metal buried injection molding and can be engaged with the pattern (such as recessed groove 123 or recessed thread) on the fitting portion 122 and becomes fixed.

Moreover, the opening 124 is for exposing the screw portion 126 inside the opening 124, and the screw portion 126 has an internal thread 125 used as a keyhole structure of the lower chopstick body 12. Additionally, the internal thread 125 of the second part 120 is separated from the outer edge of the opening 124 by a predetermined distance, so that the internal thread 125 is located deep inside the second part 120 rather than on the end of the opening 124. Likewise, the external thread 115 of the first part 110 is separated from the outer edge of the protrusion 114 by a predetermined distance, so that the external thread 115 can reach a deeper inside of the second part 120 to be screwed with the internal thread 125 firmly and does not come off easily. Hence, the problem of the screw thread being worn out due to repeated use and failing to be locked can be avoided.

Refer to FIGS. 1 and 2A. When the lower end joint block 111 of the upper chopstick body 11 is locked with the upper end joint groove 121 of the lower chopstick body 12, the upper chopstick body 11 is aligned with the lower chopstick body 12 through the chopstick body aligning structure 100 at their four or multiple sides. Meanwhile, the two aligning marks 118 and 128 of the first part 110 and the second part 120 are located on the same straight line (that is, on the axis of the chopstick body). This indicates that the upper chopstick body 11 and the lower chopstick body 12 are correctly aligned at their four or multiple sides. The more sides the polygonal chopstick has, the more precise the alignment achieved through the chopstick body aligning structure 100 is needed, so that the misalignment between the upper chopstick body 11 and the lower chopstick body 12 can be reduced.

In another embodiment, the position of the first part 110 and the position of the second part 120 can be swapped. For instance, the first part 110 is fitted with the lower chopstick body 12 to form an engagement block having the external thread 115; the second part 120 is fitted with the upper chopstick body 11 to form an engagement groove having the internal thread 125. Thus, the upper chopstick body 11 and the lower chopstick body 12 can be tightly engaged through the engagement block and the engagement groove to form a complete chopstick body.

The portable chopstick and the chopstick body aligning structure thereof disclosed in the above embodiments of the present invention can be used in the two-piece chopsticks having a square, round or polygonal shape. The upper chopstick body and the lower chopstick body can be made of different or identical materials selected from stainless steel, plastic, wood or other metals. The chopstick body aligning structure can be made of copper or other metals suitable for machining. Through the chopstick body aligning structure, the two pieces of chopstick bodies can be quickly locked, fixed and aligned to avoid the two pieces becoming loose due to the misalignment of the jointing parts or repeated use and causing inconvenience of use.

While the invention has been described by way of example and in terms of the preferred embodiment(s), it is to be understood that the invention is not limited thereto. Based on the technical features embodiments of the present invention, a person ordinarily skilled in the art will be able to make various modifications and similar arrangements and procedures without breaching the spirit and scope of protection of the invention. Therefore, the scope of protection of the present invention should be accorded with what is defined in the appended claims.

What is claimed is:

1. A portable chopstick, comprising two-piece square chopsticks, wherein the two-piece square chopsticks comprise:

an upper chopstick body having a lower end joint block;

a lower chopstick body having an opposite upper end joint groove; and a chopstick body aligning structure, which is separated into two parts and precisely positioned in the upper chopstick body and the lower chopstick body respectively, wherein, the upper chopstick body and the lower chopstick body are made of different materials; when the lower end joint block of the upper chopstick body is locked with the upper end joint groove of the lower chopstick body, the upper chopstick body is aligned with the lower chopstick body through the chopstick body aligning structure at their four sides, wherein each of the two parts of the chopstick body aligning structure has an aligning mark; when the upper chopstick body is locked with the lower chopstick body, the two aligning marks are located on a straight line.

2. The portable chopstick according to claim 1, wherein the upper chopstick body is made of plastics and is fitted with a first part of the chopstick body aligning structure by way of injection molding, and a portion of the first part forms the lower end joint block.

3. The portable chopstick according to claim 2, wherein the first part is extended along the upper chopstick body and comprises a fitting portion, a protrusion and a screw portion; the fitting portion is positioned in the upper chopstick body; the protrusion is protruded between the fitting portion and the screw portion, and a cross-sectional dimension of the protrusion matches a cross-sectional dimension of the upper chopstick body; the screw portion is extended outside the upper chopstick body and has an external thread.

4. The portable chopstick according to claim 3, wherein the first part is a metal piece formed through a machining of a computer numerical control (CNC) machine.

5. The portable chopstick according to claim 1, wherein the lower chopstick body is formed by winding a metal piece; a plastic injection piece of the lower chopstick body is fitted with a second part of the chopstick body aligning structure, and the second part forms the upper end joint groove.

6. The portable chopstick according to claim 5, wherein the second part is extended along the lower chopstick body and comprises a fitting portion, an opening and a screw portion; the fitting portion is positioned in the lower chopstick body; the opening is for exposing the screw portion inside the opening, and the screw portion has an internal thread.

7. The portable chopstick according to claim 6, wherein the second part is a metal kit formed through a machining of a computer numerical control (CNC) machine.

8. A portable chopstick, comprising two-piece polygonal chopsticks, wherein the two-piece polygonal chopsticks have multiple sides and comprises:

an upper chopstick body having a lower end joint block;

a lower chopstick body having an opposite upper end joint groove; and a chopstick body aligning structure, which is separated into two parts and precisely positioned in the upper chopstick body and the lower chopstick body respectively, wherein, the upper chopstick body and the lower chopstick body is made of different materials; when the lower end joint block of the upper chopstick body is locked with the upper end joint groove of the lower chopstick body, the upper chopstick body is aligned with the lower chopstick body through the chopstick body aligning structure at the multiple sides, wherein each of the two parts of the chopstick body aligning structure has an aligning mark; when the upper chopstick body is locked with the lower chopstick body, the two aligning marks are located on a straight line.

9. The portable chopstick according to claim 8, wherein the upper chopstick body is made of plastics and is fitted with a first part of the chopstick body aligning structure by way of injection molding, and a portion of the first part forms the lower end joint block.

10. The portable chopstick according to claim 9, wherein the first part is extended along the upper chopstick body and comprises a fitting portion, a protrusion and a screw portion; the fitting portion is positioned in the upper chopstick body; the protrusion is protruded between the fitting portion and the screw portion, and a cross-sectional dimension of the protrusion matches a cross-sectional dimension of the upper chopstick body; the screw portion is extended outside the upper chopstick body and has an external thread.

11. The portable chopstick according to claim 10, wherein the first part is a metal piece formed through a machining of a computer numerical control (CNC) machine.

12. The portable chopsticks according to claim 8, wherein the lower chopstick body is formed by winding a metal piece; a plastic injection piece of the lower chopstick body is fitted with a second part of the chopstick body aligning structure, and the second part forms the upper end joint groove.

13. The pair of portable chopstick according to claim 12, wherein the second part is extended along the lower chopstick body and comprises a fitting portion, an opening and a screw portion; the fitting portion is positioned in the lower chopstick body; the opening is for exposing the screw portion inside the opening, and the screw portion has an internal thread.

14. The portable chopstick according to claim 13, wherein the second part is a metal kit formed through a machining of a computer numerical control (CNC) machine.

15. A chopstick body aligning structure, used in a portable chopstick, the chopstick body aligning structure comprising:

a first part suitable to be fitted with one piece of chopstick body of the portable chopstick to form an engagement block; and a second part suitable to be fitted with another piece of chopstick body of the portable chopstick to form an engagement groove, wherein each of the first part and the second part has an aligning mark; when the two pieces of chopstick body are tightly locked through the engagement groove and the engagement block, the two aligning marks are located on a straight line.

16. The chopstick body aligning structure according to claim 15, wherein the first part is extended along the one piece of chopstick body and comprises a fitting portion, a protrusion and a screw portion; the fitting portion is positioned in the one piece of chopstick body; the protrusion is protruded between the fitting portion and the screw portion; a cross-sectional dimension of the protrusion matches a cross-sectional dimension of the one piece of chopstick body; the screw portion is extended outside the one piece of chopstick body and has an external thread.

17. The chopstick body aligning structure according to claim 15, wherein the second part is extended along the another piece of chopstick body and comprises a fitting portion, an opening and a screw portion; the fitting portion is positioned in the another piece of chopstick body; the opening is for exposing the screw portion inside the opening, and the screw portion has an internal thread.

* * * * *